US010407990B2

(12) United States Patent
Oehring et al.

(10) Patent No.: US 10,407,990 B2
(45) Date of Patent: Sep. 10, 2019

(54) SLIDE OUT PUMP STAND FOR HYDRAULIC FRACTURING EQUIPMENT

(71) Applicant: US Well Services LLC, Houston, TX (US)

(72) Inventors: Jared Oehring, Houston, TX (US); Brandon Neil Hinderliter, Buckhannon, WV (US)

(73) Assignee: U.S. Well Services, LLC, Houston, TX (US)

( * ) Notice: Subject to any disclaimer, the term of this patent is extended or adjusted under 35 U.S.C. 154(b) by 314 days.

(21) Appl. No.: 15/217,081

(22) Filed: Jul. 22, 2016

(65) Prior Publication Data

US 2017/0030177 A1 Feb. 2, 2017

Related U.S. Application Data

(60) Provisional application No. 62/196,525, filed on Jul. 24, 2015.

(51) Int. Cl.
*E21B 7/02* (2006.01)
*F04B 47/02* (2006.01)
(Continued)

(52) U.S. Cl.
CPC ............... *E21B 7/02* (2013.01); *E21B 7/022* (2013.01); *E21B 7/026* (2013.01); *B60P 3/00* (2013.01);
(Continued)

(58) Field of Classification Search
CPC ............. E21B 7/02; E21B 7/022; E21B 7/026
See application file for complete search history.

(56) References Cited

U.S. PATENT DOCUMENTS 1,671,436 A 5/1928 Melott
2,004,077 A 6/1935 McCartney
(Continued)

FOREIGN PATENT DOCUMENTS

AU 2007340913 7/2008
CA 2955706 10/2012
(Continued)

OTHER PUBLICATIONS

UK Power Networks—Transformers to Supply Heat to Tate Modern—from Press Releases May 16, 2013.
(Continued)

*Primary Examiner* — Kristyn A Hall
(74) *Attorney, Agent, or Firm* — Hogan Lovells US LLP

(57) ABSTRACT

A hydraulic fracturing system has a pump driven by an electrically powered motor. The pump pressurizes fluid which is piped into a wellbore to fracture a subterranean formation. The pump and motor are mounted on a trailer that is hitched to a tractor. A platform assembly is mounted onto the trailer, and which is selectively moveable between deployed and stowed configurations. The platform assembly includes a platform, a lateral rail assembly mounted to the platform, and gates on the forward and aft ends of the platform. The rail assembly and gates define a safety barrier to prevent operations personnel from falling off the platform. In the stowed configuration the platform assembly is anchored in place over wheels on the trailer. In the deployed configuration, the platform assembly provides work surface so that operations personnel can readily access the pump on the trailer.

15 Claims, 5 Drawing Sheets

(51) Int. Cl.
  *F04B 17/03* (2006.01)
  *B60P 3/00* (2006.01)
  *B60P 7/08* (2006.01)
  *F04B 49/06* (2006.01)

(52) U.S. Cl.
  CPC ............ *B60P 7/0815* (2013.01); *F04B 17/03* (2013.01); *F04B 47/02* (2013.01); *F04B 49/06* (2013.01)

(56) References Cited

U.S. PATENT DOCUMENTS

| | | |
|---|---|---|
| 2,183,364 A | 12/1939 | Bailey |
| 2,220,622 A | 11/1940 | Aitken |
| 2,248,051 A | 7/1941 | Armstrong |
| 2,753,940 A | 7/1956 | Bonner |
| 3,061,039 A | 10/1962 | Peters |
| 3,066,503 A | 12/1962 | Fleming |
| 3,334,495 A | 8/1967 | Jensen |
| 3,722,595 A | 3/1973 | Kiel |
| 3,764,233 A | 10/1973 | Strickland |
| 3,773,140 A | 11/1973 | Mahajan |
| 3,837,179 A | 9/1974 | Barth |
| 3,849,662 A | 11/1974 | Blaskowski |
| 3,881,551 A | 5/1975 | Terry |
| 4,037,431 A | 7/1977 | Sugimoto |
| 4,100,822 A | 7/1978 | Rosman |
| 4,151,575 A | 4/1979 | Hogue |
| 4,226,299 A | 10/1980 | Hansen |
| 4,265,266 A | 5/1981 | Kierbow et al. |
| 4,432,064 A | 2/1984 | Barker |
| 4,442,665 A | 4/1984 | Fick et al. |
| 4,456,092 A | 6/1984 | Kubozuka |
| 4,506,982 A | 3/1985 | Smithers et al. |
| 4,512,387 A | 4/1985 | Rodriguez |
| 4,529,887 A | 7/1985 | Johnson |
| 4,538,916 A | 9/1985 | Zimmerman |
| 4,676,063 A | 6/1987 | Goebel et al. |
| 4,793,386 A | 12/1988 | Sloan |
| 4,845,981 A | 7/1989 | Pearson |
| 4,922,463 A | 5/1990 | Del Zotto et al. |
| 5,006,044 A | 4/1991 | Walker, Sr. |
| 5,025,861 A | 6/1991 | Huber et al. |
| 5,130,628 A | 7/1992 | Owen |
| 5,131,472 A | 7/1992 | Dees et al. |
| 5,189,388 A | 2/1993 | Mosley |
| 5,422,550 A | 6/1995 | McClanahan |
| 5,548,093 A | 8/1996 | Sato |
| 5,590,976 A | 1/1997 | Kilheffer et al. |
| 5,655,361 A | 8/1997 | Kishi |
| 5,736,838 A | 4/1998 | Dove et al. |
| 5,790,972 A | 8/1998 | Kohlenberger |
| 5,865,247 A | 2/1999 | Paterson |
| 5,879,137 A | 3/1999 | Yie |
| 5,894,888 A | 4/1999 | Wiemers |
| 5,907,970 A | 6/1999 | Havlovick et al. |
| 6,138,764 A | 10/2000 | Scarsdale et al. |
| 6,142,878 A | 11/2000 | Barin |
| 6,164,910 A | 12/2000 | Mayleben |
| 6,202,702 B1 | 3/2001 | Ohira |
| 6,208,098 B1 | 3/2001 | Kume |
| 6,254,462 B1 | 7/2001 | Kelton |
| 6,271,637 B1 | 8/2001 | Kushion |
| 6,315,523 B1 | 11/2001 | Mills |
| 6,477,852 B2 | 11/2002 | Dodo |
| 6,491,098 B1 | 12/2002 | Dallas |
| 6,529,135 B1 | 3/2003 | Bowers et al. |
| 6,776,227 B2 | 8/2004 | Beida |
| 6,802,690 B2 | 10/2004 | Han |
| 6,808,303 B2 | 10/2004 | Fisher |
| 6,931,310 B2 | 8/2005 | Shimizu et al. |
| 7,104,233 B2 | 9/2006 | Ryczek et al. |
| 7,170,262 B2 | 1/2007 | Pettigrew |
| 7,173,399 B2 | 2/2007 | Sihler |
| 7,312,593 B1 | 12/2007 | Streicher et al. |
| 7,336,514 B2 | 2/2008 | Amarillas |
| 7,445,041 B2 | 11/2008 | O'Brien |
| 7,494,263 B2 | 2/2009 | Dykstra et al. |
| 7,500,642 B2 | 3/2009 | Cunningham |
| 7,525,264 B2 | 4/2009 | Dodge |
| 7,563,076 B2 | 7/2009 | Brunet |
| 7,675,189 B2 | 3/2010 | Grenier |
| 7,683,499 B2 | 3/2010 | Saucier |
| 7,717,193 B2 | 5/2010 | Egilsson et al. |
| 7,755,310 B2 | 7/2010 | West et al. |
| 7,807,048 B2 | 10/2010 | Collette |
| 7,845,413 B2 | 12/2010 | Shampine et al. |
| 7,977,824 B2 | 7/2011 | Halen et al. |
| 8,037,936 B2 | 10/2011 | Neuroth |
| 8,054,084 B2 | 11/2011 | Schulz et al. |
| 8,083,504 B2 | 12/2011 | Williams |
| 8,096,891 B2 | 1/2012 | Lochtefeld |
| 8,139,383 B2 | 3/2012 | Efraimsson |
| 8,146,665 B2 | 4/2012 | Neal |
| 8,154,419 B2 | 4/2012 | Daussin et al. |
| 8,232,892 B2 | 7/2012 | Overholt et al. |
| 8,261,528 B2 | 9/2012 | Chillar |
| 8,272,439 B2 | 9/2012 | Strickland |
| 8,310,272 B2 | 11/2012 | Quarto |
| 8,354,817 B2 | 1/2013 | Yeh et al. |
| 8,474,521 B2 | 7/2013 | Kajaria |
| 8,534,235 B2 | 9/2013 | Chandler |
| 8,573,303 B2 | 11/2013 | Kerfoot |
| 8,596,056 B2 | 12/2013 | Woodmansee |
| 8,616,274 B2 | 12/2013 | Belcher et al. |
| 8,692,408 B2 | 4/2014 | Zhang et al. |
| 8,727,068 B2 | 5/2014 | Bruin |
| 8,760,657 B2 | 6/2014 | Pope |
| 8,774,972 B2 | 7/2014 | Rusnak et al. |
| 8,789,601 B2 | 7/2014 | Broussard |
| 8,807,960 B2 | 8/2014 | Stephenson |
| 8,838,341 B2 | 9/2014 | Kumano |
| 8,851,860 B1 | 10/2014 | Mail |
| 8,857,506 B2 | 10/2014 | Stone, Jr. |
| 8,899,940 B2 | 12/2014 | Laugemors |
| 8,905,056 B2 | 12/2014 | Kendrick |
| 8,905,138 B2 | 12/2014 | Lundstedt et al. |
| 8,997,904 B2 | 4/2015 | Cryer |
| 9,018,881 B2 | 4/2015 | Mao et al. |
| 9,051,822 B2 | 6/2015 | Ayan |
| 9,067,182 B2 | 6/2015 | Nichols |
| 9,103,193 B2 | 8/2015 | Coli |
| 9,121,257 B2 | 9/2015 | Coli et al. |
| 9,140,110 B2 | 9/2015 | Coli et al. |
| 9,160,168 B2 | 10/2015 | Chapel |
| 9,175,554 B1 | 11/2015 | Watson |
| 9,206,684 B2 | 12/2015 | Parra |
| 9,322,239 B2 | 4/2016 | Angeles Boza et al. |
| 9,366,114 B2 | 6/2016 | Coli et al. |
| 9,410,410 B2 | 8/2016 | Broussard et al. |
| 9,450,385 B2 | 9/2016 | Kristensen |
| 9,458,687 B2 | 10/2016 | Hallundbaek |
| 9,475,020 B2 | 10/2016 | Coli et al. |
| 9,475,021 B2 | 10/2016 | Coli et al. |
| 9,534,473 B2 | 1/2017 | Morris et al. |
| 9,562,420 B2 | 2/2017 | Morris et al. |
| 9,587,649 B2 | 3/2017 | Oehring |
| 9,611,728 B2 | 4/2017 | Oehring |
| 9,650,879 B2 | 5/2017 | Broussard et al. |
| 9,738,461 B2 | 8/2017 | DeGaray |
| 9,745,840 B2 | 8/2017 | Oehring et al. |
| 9,863,228 B2 | 1/2018 | Shampine et al. |
| 2002/0169523 A1 | 11/2002 | Ross |
| 2003/0138327 A1 | 7/2003 | Jones et al. |
| 2004/0040746 A1 | 3/2004 | Niedermayr |
| 2004/0102109 A1 | 5/2004 | Cratty |
| 2005/0116541 A1 | 6/2005 | Seiver |
| 2005/0274508 A1 | 12/2005 | Folk |
| 2006/0052903 A1 | 3/2006 | Bassett |
| 2006/0260331 A1 | 11/2006 | Andreychuk |
| 2007/0131410 A1 | 6/2007 | Hill |
| 2007/0187163 A1 | 8/2007 | Cone |
| 2007/0201305 A1 | 8/2007 | Heilman et al. |
| 2007/0226089 A1 | 9/2007 | DeGaray et al. |

(56) References Cited

U.S. PATENT DOCUMENTS

| | | |
|---|---|---|
| 2007/0277982 A1 | 12/2007 | Shampine |
| 2007/0278140 A1 | 12/2007 | Mallet et al. |
| 2008/0112802 A1 | 5/2008 | Orlando |
| 2008/0137266 A1 | 6/2008 | Jensen |
| 2008/0208478 A1 | 8/2008 | Ella et al. |
| 2008/0217024 A1 | 9/2008 | Moore |
| 2008/0236818 A1 | 10/2008 | Dykstra |
| 2008/0264640 A1 | 10/2008 | Eslinger |
| 2008/0264649 A1 | 10/2008 | Crawford |
| 2009/0045782 A1 | 2/2009 | Datta |
| 2009/0065299 A1 | 3/2009 | Vito |
| 2009/0078410 A1 | 3/2009 | Krenek et al. |
| 2009/0090504 A1 | 4/2009 | Weightman |
| 2009/0093317 A1 | 4/2009 | Kajiwara et al. |
| 2009/0095482 A1 | 4/2009 | Surjaatmadja |
| 2009/0153354 A1 | 6/2009 | Daussin et al. |
| 2009/0188181 A1 | 7/2009 | Forbis |
| 2009/0200035 A1 | 8/2009 | Bjerkreim et al. |
| 2009/0260826 A1 | 10/2009 | Sherwood |
| 2009/0308602 A1 | 12/2009 | Bruins et al. |
| 2010/0000508 A1 | 1/2010 | Chandler |
| 2010/0019574 A1 | 1/2010 | Baldassarre |
| 2010/0051272 A1 | 3/2010 | Loree et al. |
| 2010/0101785 A1 | 4/2010 | Khvoshchev |
| 2010/0132949 A1 | 6/2010 | DeFosse et al. |
| 2010/0146981 A1 | 6/2010 | Motakef |
| 2010/0172202 A1 | 7/2010 | Borgstadt |
| 2010/0200224 A1 | 8/2010 | Nguete |
| 2010/0250139 A1 | 9/2010 | Hobbs et al. |
| 2010/0293973 A1 | 11/2010 | Erickson |
| 2010/0303655 A1 | 12/2010 | Scekic |
| 2010/0322802 A1 | 12/2010 | Kugelev |
| 2011/0005757 A1 | 1/2011 | Hebert |
| 2011/0017468 A1 | 1/2011 | Birch et al. |
| 2011/0061855 A1 | 3/2011 | Case et al. |
| 2011/0085924 A1 | 4/2011 | Shampine |
| 2011/0166046 A1 | 7/2011 | Weaver |
| 2011/0247878 A1 | 10/2011 | Rasheed |
| 2011/0272158 A1 | 11/2011 | Neal |
| 2012/0018016 A1 | 1/2012 | Gibson |
| 2012/0085541 A1 | 4/2012 | Love et al. |
| 2012/0127635 A1 | 5/2012 | Grindeland |
| 2012/0205301 A1 | 8/2012 | McGuire et al. |
| 2012/0205400 A1 | 8/2012 | DeGaray et al. |
| 2012/0232728 A1 | 9/2012 | Karimi |
| 2012/0255734 A1 | 10/2012 | Coli et al. |
| 2013/0009469 A1 | 1/2013 | Gillett |
| 2013/0025706 A1 | 1/2013 | DeGaray et al. |
| 2013/0175038 A1 | 7/2013 | Conrad |
| 2013/0175039 A1 | 7/2013 | Guidry |
| 2013/0199617 A1 | 8/2013 | DeGaray et al. |
| 2013/0233542 A1 | 9/2013 | Shampine |
| 2013/0306322 A1 | 11/2013 | Sanborn et al. |
| 2013/0341029 A1 | 12/2013 | Roberts et al. |
| 2013/0343858 A1* | 12/2013 | Flusche ............... E21B 7/026 414/800 |
| 2014/0000899 A1 | 1/2014 | Nevison |
| 2014/0010671 A1 | 1/2014 | Cryer et al. |
| 2014/0054965 A1 | 2/2014 | Jain |
| 2014/0095114 A1 | 4/2014 | Thomeer |
| 2014/0096974 A1 | 4/2014 | Coli |
| 2014/0124162 A1 | 5/2014 | Leavitt |
| 2014/0138079 A1* | 5/2014 | Broussard ............... E21B 43/26 166/66.4 |
| 2014/0174717 A1 | 6/2014 | Broussard et al. |
| 2014/0246211 A1 | 9/2014 | Guidry |
| 2014/0251623 A1 | 9/2014 | Lestz et al. |
| 2014/0277772 A1 | 9/2014 | Lopez |
| 2014/0290768 A1 | 10/2014 | Randle |
| 2014/0379300 A1 | 12/2014 | Devine et al. |
| 2015/0068724 A1 | 3/2015 | Coli et al. |
| 2015/0068754 A1 | 3/2015 | Coli et al. |
| 2015/0075778 A1 | 3/2015 | Walters |
| 2015/0083426 A1 | 3/2015 | Lesko |
| 2015/0097504 A1 | 4/2015 | Lamascus |
| 2015/0114652 A1 | 4/2015 | Lestz |
| 2015/0144336 A1 | 5/2015 | Hardin et al. |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0211524 A1 | 7/2015 | Broussard |
| 2015/0217672 A1 | 8/2015 | Shampine |
| 2015/0225113 A1 | 8/2015 | Lungu |
| 2015/0252661 A1 | 9/2015 | Glass |
| 2015/0300145 A1 | 10/2015 | Coli et al. |
| 2015/0314225 A1 | 11/2015 | Coli et al. |
| 2015/0330172 A1 | 11/2015 | Allmaras |
| 2016/0032703 A1 | 2/2016 | Broussard et al. |
| 2016/0102537 A1 | 4/2016 | Lopez |
| 2016/0105022 A1 | 4/2016 | Oehring |
| 2016/0160889 A1 | 6/2016 | Hoffman et al. |
| 2016/0177675 A1 | 6/2016 | Morris et al. |
| 2016/0177678 A1 | 6/2016 | Morris |
| 2016/0186531 A1 | 6/2016 | Harkless et al. |
| 2016/0208592 A1 | 7/2016 | Oehring |
| 2016/0208593 A1 | 7/2016 | Coli et al. |
| 2016/0208594 A1 | 7/2016 | Coli et al. |
| 2016/0208595 A1 | 7/2016 | Tang |
| 2016/0221220 A1 | 8/2016 | Paige |
| 2016/0230524 A1 | 8/2016 | Dumoit |
| 2016/0230525 A1 | 8/2016 | Lestz et al. |
| 2016/0258267 A1 | 9/2016 | Payne et al. |
| 2016/0273328 A1 | 9/2016 | Oehring |
| 2016/0290114 A1 | 10/2016 | Oehring |
| 2016/0312108 A1 | 10/2016 | Lestz et al. |
| 2016/0319650 A1 | 11/2016 | Oehring |
| 2016/0326854 A1 | 11/2016 | Broussard |
| 2016/0326855 A1 | 11/2016 | Coli et al. |
| 2016/0341281 A1 | 11/2016 | Brunvold et al. |
| 2016/0348479 A1 | 12/2016 | Oehring |
| 2016/0349728 A1 | 12/2016 | Oehring |
| 2016/0369609 A1 | 12/2016 | Morris et al. |
| 2017/0021318 A1 | 1/2017 | McIver et al. |
| 2017/0022788 A1 | 1/2017 | Oehring et al. |
| 2017/0022807 A1 | 1/2017 | Dursun |
| 2017/0028368 A1 | 2/2017 | Oehring et al. |
| 2017/0030178 A1 | 2/2017 | Oehring et al. |
| 2017/0036178 A1 | 2/2017 | Coli et al. |
| 2017/0037717 A1 | 2/2017 | Oehring |
| 2017/0037718 A1 | 2/2017 | Coli et al. |
| 2017/0051732 A1 | 2/2017 | Hemandez et al. |
| 2017/0096885 A1 | 4/2017 | Oehring |
| 2017/0104389 A1 | 4/2017 | Morris et al. |
| 2017/0114625 A1 | 4/2017 | Norris |
| 2017/0218843 A1 | 8/2017 | Oehring et al. |
| 2017/0222409 A1 | 8/2017 | Oehring et al. |
| 2017/0226842 A1 | 8/2017 | Omont et al. |
| 2017/0241221 A1 | 8/2017 | Seshadri |
| 2017/0259227 A1 | 9/2017 | Morris et al. |
| 2017/0292513 A1 | 10/2017 | Haddad |
| 2017/0313499 A1 | 11/2017 | Hughes et al. |
| 2017/0314380 A1 | 11/2017 | Oehring |
| 2017/0328179 A1 | 11/2017 | Dykstra |
| 2017/0369258 A1 | 12/2017 | DeGaray |
| 2018/0038216 A1 | 2/2018 | Zhang |
| 2018/0320483 A1 | 11/2018 | Zhang |
| 2019/0003329 A1 | 1/2019 | Morris |

FOREIGN PATENT DOCUMENTS

| | | |
|---|---|---|
| CA | 2966672 | 10/2012 |
| CA | 2833711 | 5/2014 |
| CA | 2964593 | 10/2017 |
| CN | 201687513 | 12/2010 |
| CN | 101977016 | 2/2011 |
| CN | 202023547 | 11/2011 |
| CN | 102602322 | 7/2012 |
| JP | 2004264589 | 9/2004 |

(56) References Cited

FOREIGN PATENT DOCUMENTS

| WO | 2016/144939 | 9/2016 |
|---|---|---|
| WO | 2016/160458 | 10/2016 |

OTHER PUBLICATIONS

Non-Final Office Action issued in corresponding U.S. Appl. No. 15/486,970 dated Jun. 22, 2017.
Non-Final Office Action issued in corresponding U.S. Appl. No. 15/487,656 dated Jun. 23, 2017.
Non-Final Office Action issued in corresponding U.S. Appl. No. 15/487,694 dated Jun. 26, 2017.
Final Office Action issued in corresponding U.S. Appl. No. 15/294,349 dated Jul. 6, 2017.
Non-Final Office Action issued in corresponding U.S. Appl. No. 14/884,363 dated Sep. 5, 2017.
Final Office Action issued in corresponding Application No. 15/145,491 dated Sep. 6, 2017.
Non-Final Office Action issued in corresponding U.S. Appl. No. 15/293,681 dated Feb. 16, 2017.
Non-Final Office Action issued in corresponding U.S. Appl. No. 15/294,349 dated Mar. 14, 2017.
Final Office Action issued in corresponding U.S. Appl. No. 15/145,491 dated Jan. 20, 2017.
Non-Final Office Action issued in corresponding U.S. Appl. No. 15/145,443 dated Feb. 7, 2017.
Notice of Allowance issued in corresponding U.S. Appl. No. 15/217,040 dated Mar. 28, 2017.
Notice of Allowance issued in corresponding U.S. Appl. No. 14/622,532 dated Mar. 27, 2017.
Non-Final Office Action issued in corresponding U.S. Appl. No. 15/291,842 dated Jan. 6, 2017.
Canadian Office Action dated Mar. 2, 2018 in related Canadian Patent Application No. 2,833,711.
Office Action dated Apr. 10, 2018 in related U.S. Appl. No. 15/294,349.
Office Action dated Apr. 2, 2018 in related U.S. Appl. No. 15/183,387.
Office Action dated May 29, 2018 in related U.S. Appl. No. 15/235,716.
Canadian Office Action dated Apr. 18, 2018 in related Canadian Patent Application No. 2,928,711.
Canadian Office Action dated Jun. 22, 2018 in related Canadian Patent Application No. 2,886,697.
Office Action dated Jul. 25, 2018 in related U.S. Appl. No. 15/644,487.
Non-Final Office Action issued in Corresponding Application No. 15/145,491 dated May 15, 2017.
Non-Final Office Action dated Oct. 6, 2017 in related U.S. Appl. No. 14/881,535.
Non-Final Office Action dated Nov. 29, 2017 in related U.S. Appl. No. 15/145,414.
Non-Final Office Action dated Nov. 13, 2017 in related U.S. Appl. No. 15/644,487.
Non-Final Office Action dated Feb. 12, 2019 in related U.S. Appl. No. 16/170,695.
International Search Report and Written Opinion dated Feb. 15, 2019 in related PCT Application No. PCT/US18/63977.
Non-Final Office Action dated Feb. 25, 2019 in related U.S. Appl. No. 16/210,749.
International Search Report and Written Opinion dated Mar. 5, 2019 in related PCT Application No. PCT/US18/63970.
Non-Final Office Action dated Mar. 6, 2019 in related U.S. Appl. No. 15/183,387.
Office Action dated Mar. 1, 2019 in related Canadian Patent Application No. 2,943,275.
Office Action dated Jan. 30, 2019 in related Canadian Patent Application No. 2,936,997.
International Search Report and Written Opinion dated Sep. 19, 2018 in related PCT Patent Application No. PCT/US2018/040683.
Canadian Office Action dated Sep. 28, 2018 in related Canadian Patent Application No. 2,945,281.
Office Action dated Dec. 12, 2018 in related U.S. Appl. No. 16/160,708.
International Search Report and Written Opinion dated Jan. 2, 2019 in related PCT Patent Application No. PCT/US18/54542.
International Search Report and Written Opinion dated Jan. 2, 2019 in related PCT Patent Application No. PCT/US18/54548.
International Search Report and Written Opinion dated Dec. 31, 2018 in related PCT Patent Application No. PCT/US18/55913.
International Search Report and Written Opinion dated Jan. 4, 2019 in related PCT Patent Application No. PCT/US18/57539.
International Search Report and Written Opinion dated Apr. 10, 2019 in corresponding PCT Application No. PCT/US2019/016635.
Notice of Allowance dated Apr. 23, 2019 in corresponding U.S. Appl. No. 15/635,028.
Schlumberger, "Jet Manual 23, Fracturing Pump Units, SPF/SPS-343, Version 1.0," Jan. 31, 2007, 68 pages.
Stewart & Stevenson, "Stimulation Systems," 2007, 20 pages.
Luis Gamboa, "Variable Frequency Drives in Oil and Gas Pumping Systems," Dec. 17, 2011, 5 pages.
"Griswold Model 811 Pumps: Installation, Operation and Maintenance Manual, Ansi Process Pump," 2010, 60 pages.

\* cited by examiner

SLIDE OUT PUMP STAND FOR HYDRAULIC FRACTURING EQUIPMENT

CROSS REFERENCE TO RELATED APPLICATIONS

This application claims priority to and the benefit of, U.S. Provisional Application Ser. No. 62/196,525, filed Jul. 24, 2015, and is a continuation-in-part of, and claims priority to and the benefit of co-pending U.S. patent application Ser. No. 13/679,689, filed Nov. 16, 2012, the full disclosures of which are hereby incorporated by reference herein for all purposes.

BACKGROUND OF THE INVENTION

1. Field of Invention

The present disclosure relates to a system for hydraulically fracturing a subterranean formation. More specifically, the present disclosure relates to a frame for hydraulic fracturing equipment that includes a retractable platform.

2. Description of Prior Art

Hydraulic fracturing is a technique used to stimulate production from some hydrocarbon producing wells. The technique usually involves injecting fluid into a wellbore at a pressure sufficient to generate fissures in the formation surrounding the wellbore. Typically the pressurized fluid is injected into a portion of the wellbore that is pressure isolated from the remaining length of the wellbore so that fracturing is limited to a designated portion of the formation. The fracturing fluid, whose primary component is usually water, includes proppant (such as sand or ceramic) that migrate into the fractures with the fracturing fluid and remain to prop open the fractures after pressure is no longer applied to the wellbore.

The fracturing fluid is usually pressurized on surface by high pressure pumps powered by diesel engines. To produce the pressures required for hydraulic fracturing, the pumps and associated engines have substantial volume and mass. Heavy duty trailers are required for transporting the large and heavy pumps and engines to sites where wellbores are being fractured. Each pump is usually equipped with a water manifold (referred to as a fluid end) which contains seats, valves, and keepers internally. These parts allow the pump to draw in low pressure fluid (approximately 100 psi) and discharge the same fluid at high pressures (over 10,000 psi). These seats and valves often erode due to the proppant in the fracturing fluid; which sometimes requires frequent replacement. Replacing the eroded components can be hazardous as the fluid ends are typically above grade on mobile trailers, and which generally have limited space on which maintenance personnel can stand. The height hazard is compounded by the use of heavy pump tools for assembly and disassembly of the fluid end for part replacement.

SUMMARY OF THE INVENTION

Disclosed herein is an example of a hydraulic fracturing system for fracturing a subterranean formation and which includes a plurality of electric pumps fluidly connected to the formation, and powered by at least one electric motor, and configured to pump fluid at high pressure into a wellbore that intersects the formation, so that the fluid passes from the wellbore into the formation, and fractures the formation, a variable frequency drive connected to the electric motor to control the speed of the motor, wherein the variable frequency drive frequently performs electric motor diagnostics to prevent damage to the at least one electric motor, a trailer on which the motor and pumps are mounted, and a platform assembly mounted to the trailer and from which at least a one of the pumps are accessible by operations personnel. The platform assembly can be selectively moveable between a stowed configuration and spaced laterally inward from an outer periphery of wheels coupled with the trailer, to a deployed configuration and spaced laterally past an outer periphery of the wheels. In one example, support rails are mounted to the platform assembly that slidingly engage mount assemblies that are coupled to the trailer. Bores are optionally formed in the support rails register with holes in the mount assemblies when the platform assembly is in the stowed configuration, and wherein a pin selectively inserts through the bores and holes to anchor the platform assembly in the stowed configuration. Rollers may optionally be included in the mount assemblies that rotate when the support rails slidingly engage the mount assemblies. In an example, the platform assembly includes a lateral rail assembly on a side that is distal from the pump. Further included in this example embodiment are end gates on forward and aft ends of the platform assembly that are pivotingly mounted on opposing axial ends of the lateral rail assembly. The end gates can swing into orientations that are substantially perpendicular with the lateral rail assembly when the platform assembly is moved into a deployed configuration. In one embodiment, a pair of motors are first and second motors, and a pair of pumps are first and second pumps, wherein the first and second pumps and motors are mounted on the trailer, wherein the first motor is coupled to and drives the first pump, and wherein the second motor is coupled to and drives the second pump.

Also described herein is a hydraulic fracturing system for fracturing a subterranean formation and that includes a trailer, a pump on the trailer that selectively pressurizes fracturing fluid, an electrically powered motor that drives the pump, a variable frequency drive in electrical communication with the motor, and a platform assembly coupled with the trailer and that is adjacent the pump so that when operations personnel are on the platform assembly, locations on the pump are accessible by the operations personnel. In one example, the platform assembly is stowed so that an outer lateral side of the platform assembly is set laterally inward from an outer edge of wheels that are mounted to the trailer. The platform assembly can be moveable from being stowed into a deployed configuration where the platform assembly projects laterally past the wheels. In one embodiment, the platform assembly includes a lateral rail assembly, a forward gate, and an aft gate and which define a safety barrier for operations personnel on the platform assembly. The gates can each have a lateral side that is affixed by a hinge to the lateral rail assembly and on opposite sides, the hinge can be made up of a vertically oriented pin and spring, wherein the spring swings free ends of the gates away from the lateral rail assembly when the platform assembly is changed from a stowed configuration to a deployed configuration. Elastomeric bungees can be included that each having an end affixed to the lateral rail assembly, and free ends that selectively insert into slotted clips affixed to inner frames on the gates. Stop members can be included on the gates that mount to inner frames on the gates and abut the pins when the gates rotate to positions that are substantially perpendicular with the lateral rail assembly. In one embodiment, the platform assembly includes a platform with a deck and frame, support rails that coupled to the platform, and mounting assemblies attached to a frame of the trailer and which slidingly receive the support rails.

BRIEF DESCRIPTION OF DRAWINGS

Some of the features and benefits of the present invention having been stated, others will become apparent as the description proceeds when taken in conjunction with the accompanying drawings, in which.

Figure 1:
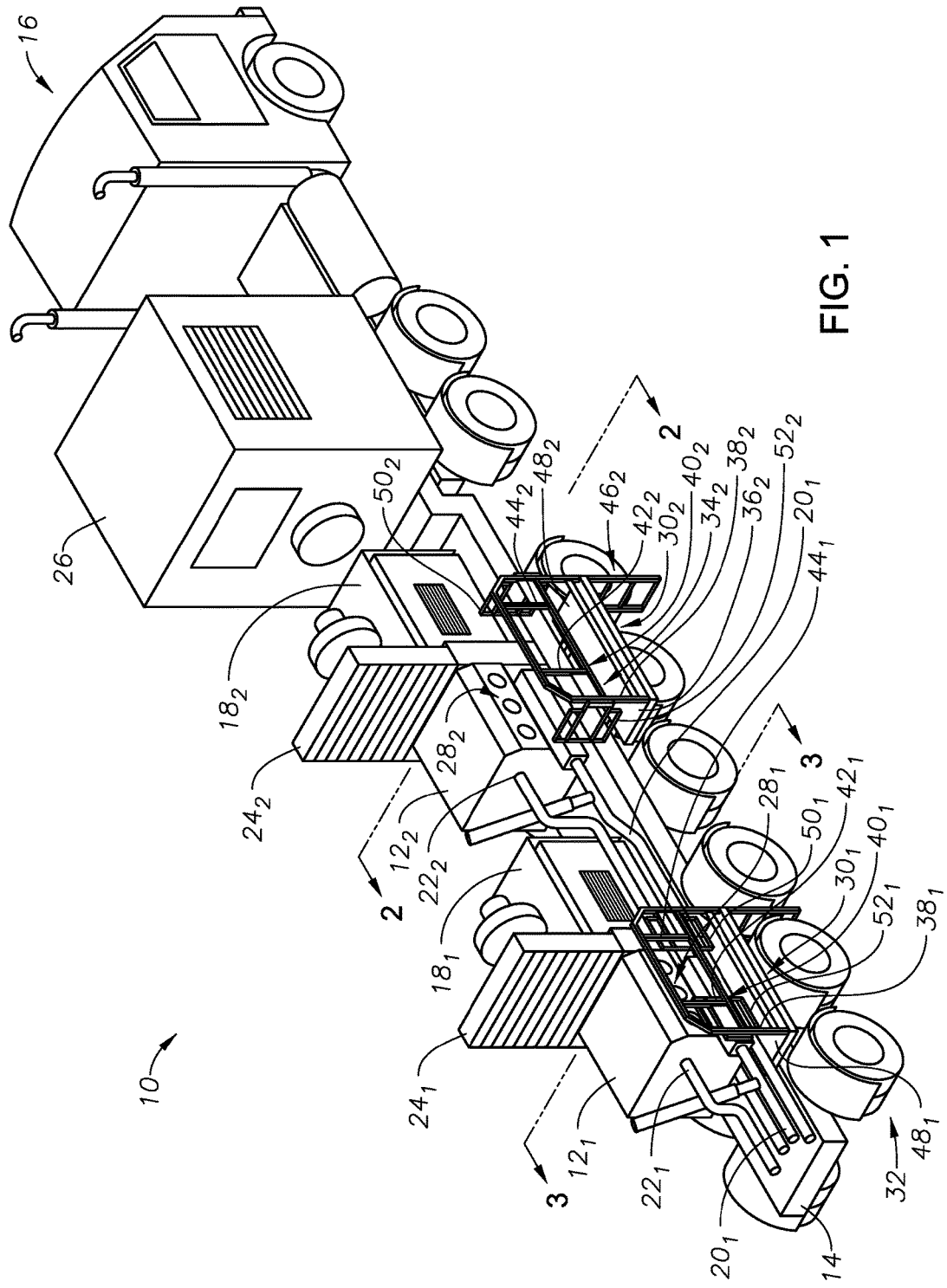
FIG. 1 is a perspective view of an example of a trailerized pump system.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Shown in a side perspective view in FIG. 1 is one example of a trailerized pump system 10 which is shown having pumps $12_1$, $12_2$ mounted on a trailer 14. As described in more detail below, pumps $12_1$, $12_2$ pressurize fracturing fluid that is then delivered into a wellbore for fracturing a formation. In the illustrated example, the pumps $12_1$, $12_2$ are mounted on the trailer 14; where trailer 14 couples with a tractor 16 for transporting the trailer 14 and pumps $12_1$, $12_2$ to different locations. Also mounted on trailer 14 are motors $18_1$, $18_2$ which are used for driving pumps $12_1$, $12_2$ and which are electrically powered. Suction piping leads $20_1$, $20_2$ respectively couple to a suction side of pumps $12_1$, $12_2$ and which provide the fracturing fluid to pumps $12_1$, $12_2$. Similarly, discharge piping leads $22_1$, $22_2$ transfer the fluid pressurized by pumps $12_1$, $12_2$ to their destination. Radiators $24_1$, $24_2$ are further shown on trailer 14 and are provided for cooling hydraulic fluids associated with the pumps $12_1$, $12_2$ and motors $18_1$, $18_2$. A control room 26 is depicted at a forward end of trailer 14 proximate tractor 16, and which houses various controls and monitoring displays (not shown) for operating devices located within system 10.

Mounted on a side of pumps $12_1$, $12_2$ facing the lateral side of trailer 14 are cover plate sets $28_1$, $28_2$, which when removed provide access to various components within pumps $12_1$, $12_2$ that require regular maintenance as well as repair and replacement. Example components include seals, valves, seats, and keepers (not shown). Accordingly, platform assemblies $30_1$, $30_2$ are shown provided with trailer 14 and which can selectively be deployed so that operations personnel can access the pumps $12_1$, $12_2$ and remove cover plate sets $28_1$, $28_2$ for repairing pumps $12_1$, $12_2$. More specifically, platform assembly $30_1$ is shown in a stowed position and proximate a lateral side of trailer 14, whereas platform assembly $30_2$ is shown in a deployed configuration and slid laterally outward from the lateral edge of trailer 14. When in the stowed configuration, platform assembly $30_1$ is set above wheels 32 that are mounted onto trailer 14. The platform assemblies $30_1$, $30_2$ are strategically formed so that when they are each in the stowed position their outer lateral peripheries terminate within the outer edge of wheels 32. Thus when in the stowed position, the platform assemblies $30_1$, $30_2$ are set laterally inward from the outer edge of the wheels 32, which prevents interference between the platform assemblies $30_1$, $30_2$ and other objects when the system 10 is in transit.

Figure 2:
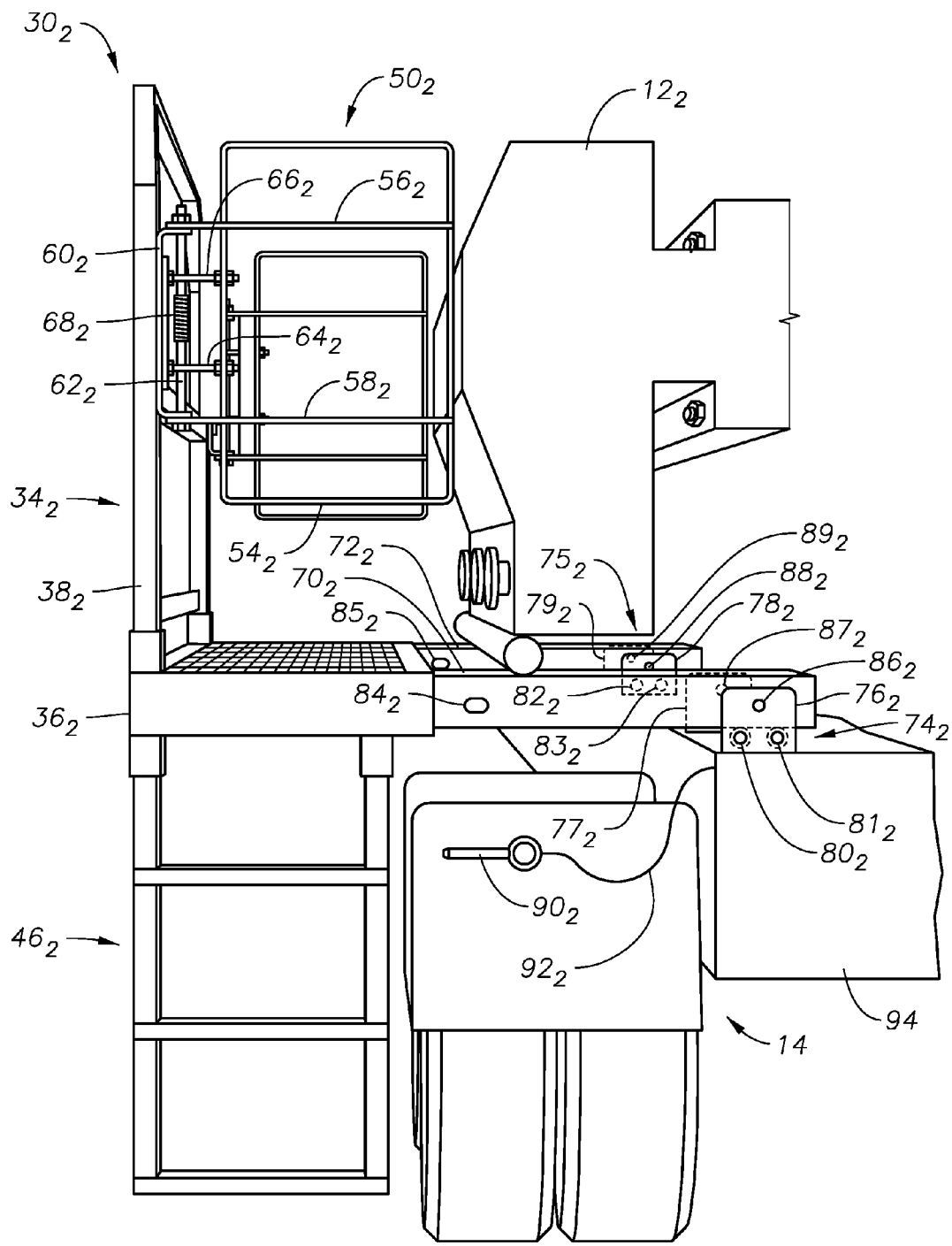
FIG. 2 is an end view of an example of a platform assembly for use with the trailerized pump system of FIG. 1 and in a deployed configuration.
Figure 3:
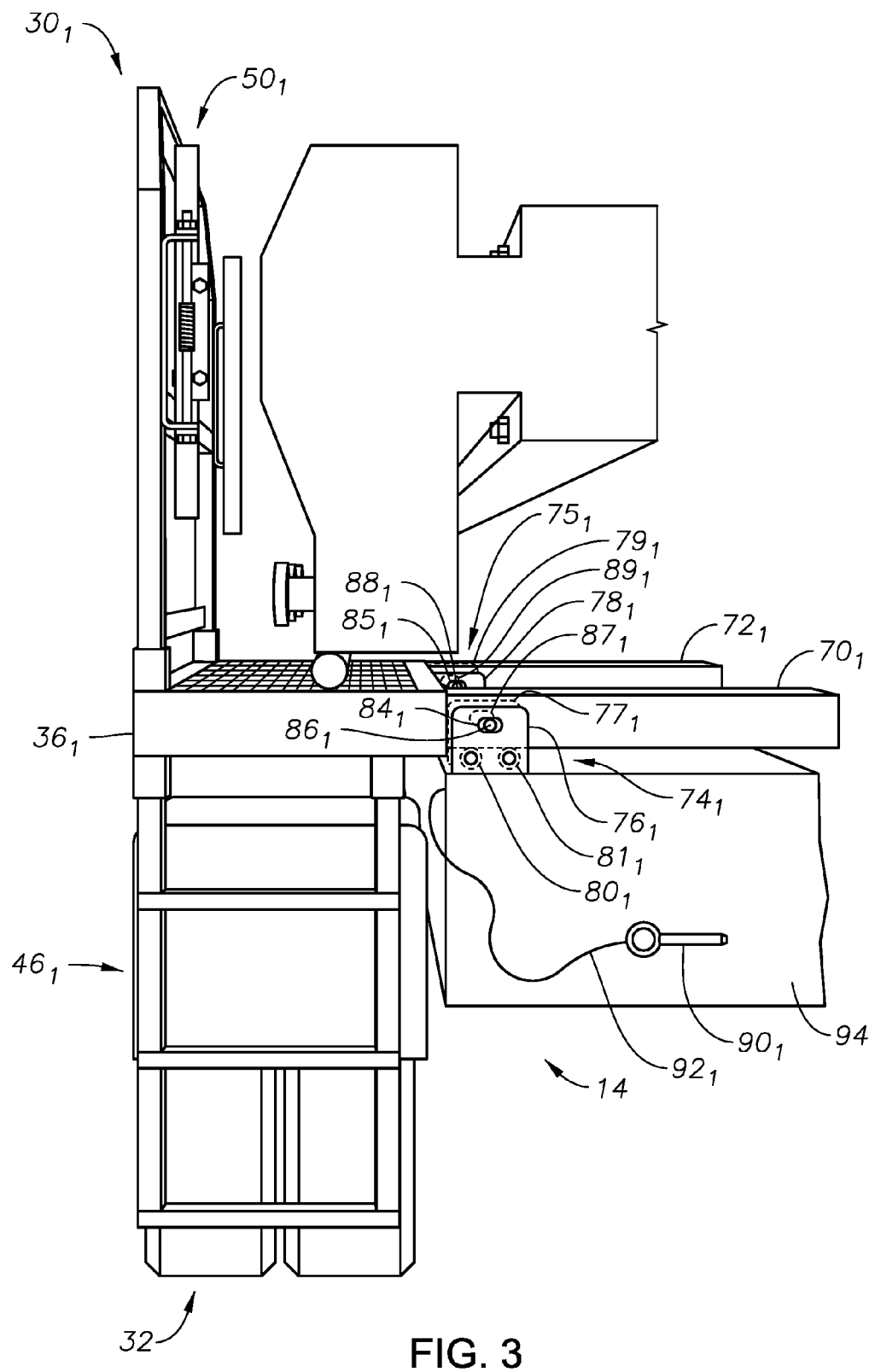
FIG. 3 is an end view of an example of a platform assembly for use with the trailerized pump system of FIG. 1 and in a stowed configuration.

Referring now to FIGS. 1, 2, and 3, lateral rail assembly $34_1$, $34_2$ are respectively provided on platform assemblies $30_1$, $30_2$. Lateral rail assemblies $34_1$, $34_2$ are transversely mounted on a platform 36 that is generally parallel with an upper surface of trailer 14. A frame $38_1$, $38_2$, which makes up a part of the lateral rail assemblies $34_1$, $34_2$, is a generally U-shaped member and having either a circular or rectangular cross-section. Opposing ends of frame $38_1$, $38_2$, mount onto corners of the platform 36 distal from its coupling with trailer 14. Mid-beams $40_1$, $40_2$ are shown extending between vertically disposed portions of frame $38_1$, $38_2$. Balusters $44_1$, $44_2$ are illustrated that vertically span the distance between mid-beams $40_1$, $40_2$ and upper longitudinally extending portions of frames $38_1$, $38_2$. A forward end of each of the platform assemblies $30_1$, $30_2$ includes a ladder assembly $46_1$, $46_2$ which provides rungs and side rails on which operations personnel can climb onto platform $36_1$, $36_2$. Each platform $36_1$, $36_2$ includes a deck $48_1$, $48_2$ which extends in generally the same plane as platform $36_1$, $36_2$. Each deck $48_1$, $48_2$ may optionally be solid, or formed from a grated material with openings therethrough so that liquids and other slippery substances can fall therethrough and avoid a slick surface for operations personnel working on platforms $36_1$, $36_2$. In an embodiment, the platform assemblies $30_1$, $30_2$ are strategically formed so that operations personnel on the platform assemblies $30_1$, $30_2$ can access a coupler (not shown) between the pumps $12_1$, $12_2$, and motors $18_1$, $18_2$.

Forward ends of the platform assemblies $30_1$, $30_2$ are fitted with forward gates $50_1$, $50_2$ that selectively pivot respectively from the forward ends frames $38_1$, $38_2$ and provide a safety barrier to prevent operations personnel from accidentally falling from platforms $36_1$, $36_2$. However, because the gates $50_1$, $50_2$, $52_1$, $52_2$ are pivotally mounted, they can be rotated back against the frames so that operations personnel can access or leave the platform assemblies $30_1$, $30_2$. Similarly, aft gates $52_1$, $52_2$ are provided on ends of frame $38_1$, $38_2$ distal from forward gates $50_1$, $50_2$. Referring now to FIG. 2, which is taken along lines 2-2 of FIG. 1, shown in side view is an example of forward gate $50_2$, and which includes an outer frame $54_2$, which is a generally elongate member and fashioned into a rectangular shape. Provided with the outer frame $54_2$ are longitudinally extending arms $56_2$, $58_2$ that are vertically spaced apart from one another, and project between the vertical portions of the member of outer frame $54_2$. Ends of the arms $56_2$, $58_2$ couple onto a mounting bracket $60_2$ which mounts to a vertical portion of frame $38_2$. A vertically oriented rod $62_2$ projects through holes formed in ends of arms $56_2$, $58_2$. The holes in the ends of arms $56_2$, $58_2$ register with holes bored in horizontally disposed sections of the mounting bracket $60_2$. Rod $62_2$ projects through holes in arms $56_2$, $58_2$ and in bracket $60_2$ thereby pivotally coupling together the forward gate $50_2$ and frame $38_2$. Stop members $64_2$, $66_2$ also couple into a vertical section of outer frame $54_2$ and abut a panel mounted to frame $38_2$ thereby limiting the rotational motion of the forward gate $50_2$. A spring $68_2$ circumscribes a portion of the rod $62_2$ and when the platform assembly $30_2$ is moved into the deployed position as shown in FIG. 2, the spring $68_2$ pivotingly urges the forward gate $50_2$ away from frame $38_2$. Aft gate $52_2$, which is substantially similar to forward gate $50_2$, also includes a spring that causes aft gate $52_2$ to pivotingly swing aft gate $52_2$ away from frame $38_2$. Thus the combination of gates $50_2$, $52_2$ and frame $38_2$ define a safety barrier for operations personnel disposed on the deck $48_2$ and prevents operations personnel from falling from platform $36_2$.

Referring now to FIGS. 2 and 3, support rails $70_{1,2}$, $72_{1,2}$ are shown which are generally elongate members that are horizontally disposed, and project laterally inward from platforms $36_1$, $36_2$. More specifically, support rails $70_1$, $72_1$ are coupled with platform $36_1$, and support rails $70_2$, $72_2$ are coupled with platform $36_2$. Support rails $70_1$, $72_1$ slidingly engage mount assemblies $74_1$, $75_1$ respectively, and support rails $70_2$, $72_2$ slidingly engage mount assemblies $74_2$, $75_2$ respectively. Mount assembly $74_1$ is made up of a pair of vertically disposed lateral plates $76_1$, $77_1$ that are substantially parallel with one another and axially spaced apart. Similarly, mount assembly $74_2$ is made up of a pair of vertically disposed lateral plates $76_2$, $77_2$ that are also substantially parallel with one another and axially spaced apart. Support rail $70_1$ engages mount assembly $74_1$ between plates $76_2$, $77_2$. Further, mount assembly $75_1$ is made up of a pair of vertically disposed and parallel lateral plates $78_1$, $79_1$; and mount assembly $75_2$ includes lateral plates $78_2$, $79_2$ that are also substantially parallel with one another and axially spaced apart. Rollers $80_1$, $81_1$ span between lateral plates $76_1$, $77_1$ and which support rail $70_1$ as it slidingly reciprocates with respect to mount assembly $74_1$. Rollers $80_2$, $81_2$ connected between lateral plates $76_2$, $77_2$ provide rolling support for rail $71_2$, rollers (not shown) extend between lateral plates $78_1$, $79_1$ which bolster support rail $72_1$, and rollers $82_2$, $83_2$ are anchored across lateral plates $78_2$, $79_2$ to provide rolling support for support rail $72_2$.

The sliding engagement of the support rails $70_{1,2}$, $72_{1,2}$ with the mount assemblies $74_{1,2}$, $75_{1,2}$ allows the platform assemblies $30_1$, $30_2$ to be readily moved between the stowed and deployed configurations of FIG. 2. Further, rollers or other structure (not shown) slidingly contacts an upper surface of rails $70_{1,2}$, $72_{1,2}$ which maintains the rails $70_{1,2}$, $72_{1,2}$ in a generally horizontal orientation so that the decks $48_1$, $48_2$ remain substantially horizontal when the platform assemblies $30_1$, $30_2$ are deployed and when stowed. Bores $84_{1,2}$, $85_{1,2}$ are shown formed axially through the support rails $70_{1,2}$, $72_{1,2}$, and that selective register with holes $86_{1,2}$, $87_{1,2}$, $88_{1,2}$, $89_{1,2}$, formed through the lateral plates $76_{1,2}$, $77_{1,2}$, $78_{1,2}$, $79_{1,2}$, allow pins $90_{1,2}$ to be inserted therethrough thereby locking support rails $70_{1,2}$, $72_{1,2}$, to the mount assemblies $74_{1,2}$, $75_{1,2}$ and thereby coupling and securing the platform assemblies $30_1$, $30_2$ to the trailer 14. Lanyards $92_{1,2}$ are shown holding pins $90_{1,2}$ to the trailer frame 94.

Figure 4:
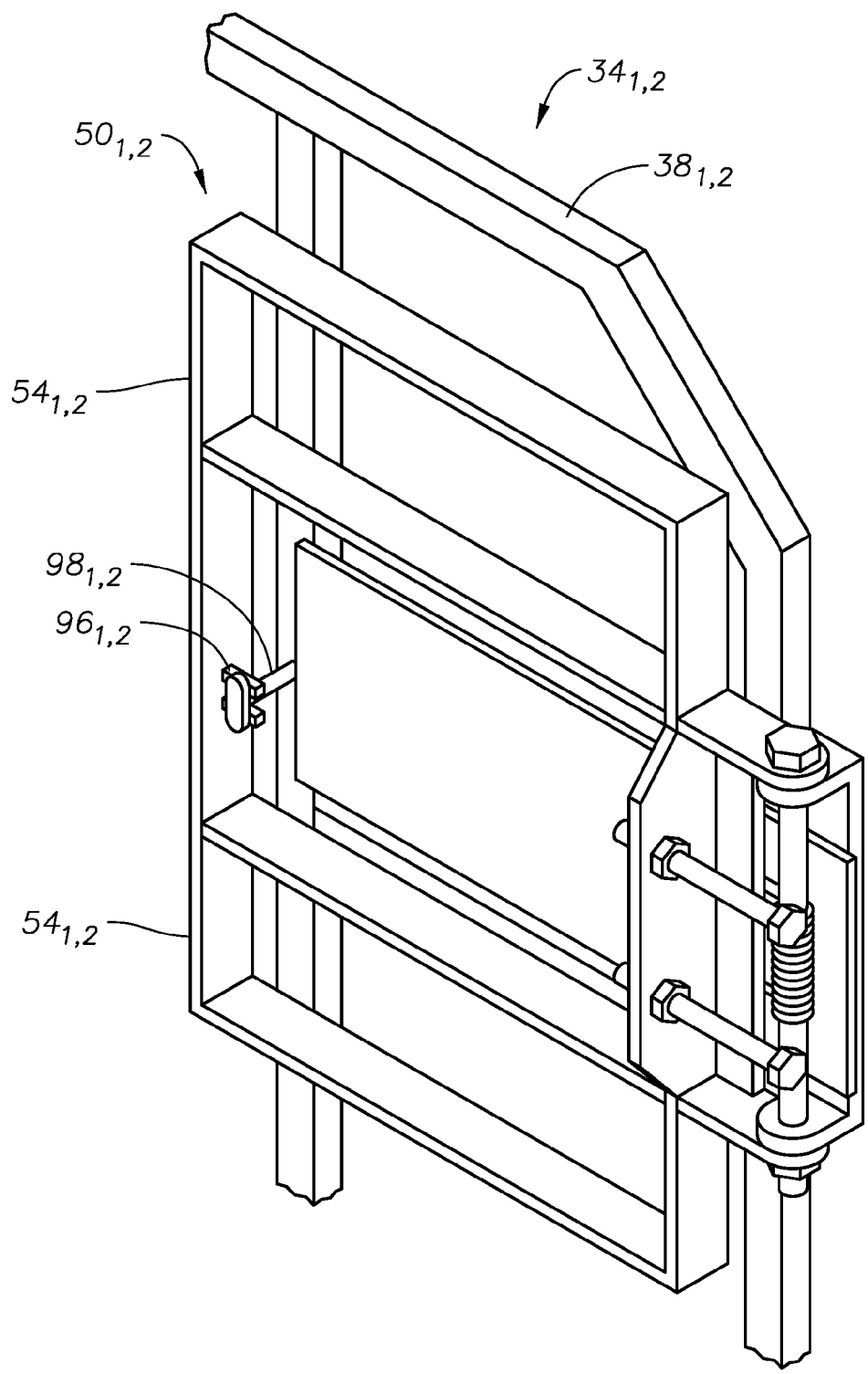
FIG. 4 is a perspective view of an example of a gate that is part of the platform assemblies of FIGS. 2 and 3.

Referring now to FIG. 4, in this example gates $50_{1,2}$ are shown in the retracted position with their outer frames $54_{1,2}$ adjacent to and parallel with the frames $38_{1,2}$ of the rail assemblies $34_{1,2}$. In this example, slotted clips $96_{1,2}$ are provided on the frames $54_{1,2}$ and in which enlarged ends of bungees $98_{1,2}$ selectively are inserted into the clips $96_{1,2}$ which retain the gates $50_{1,2}$ against the frames $38_{1,2}$ when the platform assemblies $30_1$, $30_2$ (FIG. 1) are in their retracted or stowed positions. In an embodiment, bungees $98_{1,2}$ are formed from an elastomeric material.

Figure 5:
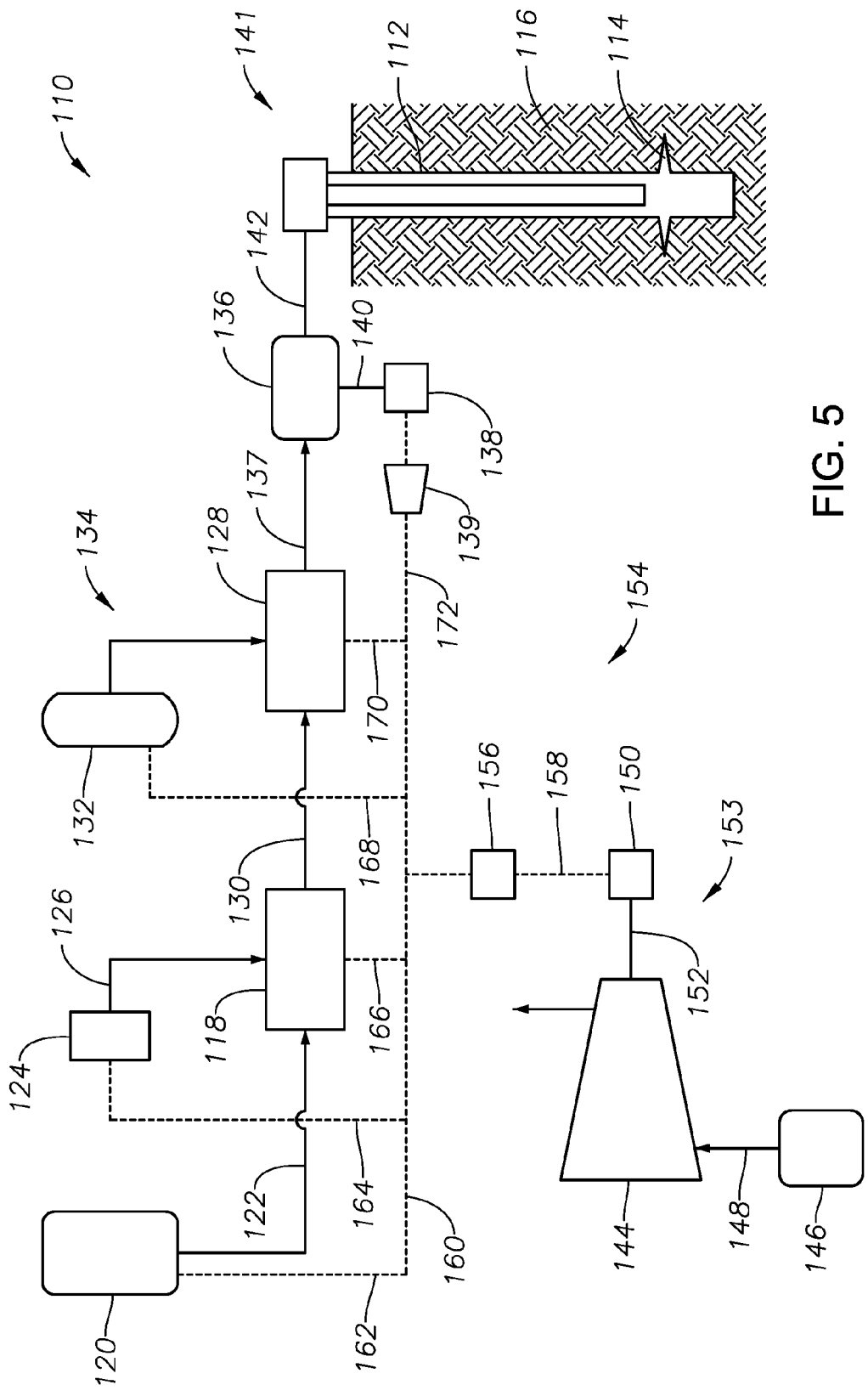
FIG. 5 is a schematic example of a hydraulic fracturing system.

FIG. 5 is a schematic example of a hydraulic fracturing system 110 that is used for pressurizing a wellbore 112 to create fractures 114 in a subterranean formation 116 that surrounds the wellbore 112. Included with the system 110 is a hydration unit 118 that receives fluid from a fluid source 120 via line 122, and also selectively receives additives from an additive source 124 via line 126. Additive source 124 can be separate from the hydration unit 118 as a stand along unit, or can be included as part of the same unit as the hydration unit 118. The fluid, which in one example is water, is mixed inside of the hydration unit 118 with the additives. In an embodiment, the fluid and additives are mixed over a period of time to allow for uniform distribution of the additives within the fluid. In the example of FIG. 5, the fluid and additive mixture is transferred to a blender 128 via line 130. A proppant source 132 contains proppant, which is delivered to the blender 128 as represented by line 134, where line 134 can be a conveyer. Inside the blender 128, the proppant and fluid/additive mixture are combined to form a slurry, which is then transferred to a fracturing pump 136 via line 137. Blender 128 can have an onboard chemical additive system, such as with chemical pumps and augers. Optionally, additive source 124 can provide chemicals to blender 128; or a separate and standalone chemical additive system (not shown) can be provided for delivering chemicals to the blender 128. In an example, the pressure of the slurry in line 137 ranges from around 80 psi to around 100 psi. The pressure of the slurry can be increased up to around 15,000 psi by pump 136. A motor 138, which connects to pump 136 via shaft 140, drives pump 136 so that it can pressurize the slurry. In one example, the motor 138 is controlled by a variable frequency drive ("VFD") 139. After being discharged from pump 136, slurry is injected into a wellhead assembly 141; discharge piping 142 connects discharge of pump 136 with wellhead assembly 141 and provides a conduit for the slurry between the pump 136 and the wellhead assembly 141. In an alternative, hoses or other connections can be used to provide a conduit for the slurry between the pump 136 and the wellhead assembly 141. Optionally, any type of fluid can be pressurized by the fracturing pump 136 to form an injection fluid that is then injected into the wellbore 112 for fracturing the formation 114, and is not limited to fluids having chemicals or proppant. In one example, a one or more of the trailerized pump systems 10 of FIG. 1 is made up of the fracturing pump 136, motor 138, and VFD 139.

An example of a turbine 144 is provided in the example of FIG. 1 and which receives a combustible fuel from a fuel source 146 via a feed line 148. In one example, the combustible fuel is natural gas, and the fuel source 146 can be a container of natural gas or a well (not shown) proximate the turbine 144. Combustion of the fuel in the turbine 144 in turn powers a generator 150 that produces electricity. Shaft 152 connects generator 150 to turbine 144. The combination of the turbine 144, generator 150, and shaft 152 define a turbine generator 153. In another example, gearing can also be used to connect the turbine 144 and generator 150. An example of a micro-grid 154 is further illustrated in FIG. 5, and which distributes electricity generated by the turbine generator 153. Included with the micro-grid 154 is a transformer 156 for stepping down voltage of the electricity generated by the generator 150 to a voltage more compatible for use by electrical powered devices in the hydraulic fracturing system 110. In another example, the power generator by the turbine generator 153 and the power utilized by the electrical powered devices in the hydraulic fracturing system 110 are of the same voltage, such as 4160 V so that main power transformers are not needed. In one embodiment, multiple 3500 kVA dry cast coil transformers are utilized. Electricity generated in generator 150 is conveyed to transformer 156 via line 158. In one example, transformer 156 steps the voltage down from 13.8 kV to around 600 V. Other step down voltages can include 4,160 V, 600V, 480 V, or other voltages. The output or low voltage side of the transformer 156 connects to a power bus 160, lines 162, 164, 166, 168, 170, and 172 connect to power bus 160 and deliver electricity to electrically powered end users in the system 110. More specifically, line 162 connects fluid source 120 to bus 160, line 164 connects additive source 124 to bus, line 166 connects hydration unit 118 to bus 160, line 168 connects proppant source 132 to bus 160, line 170 connects blender 128 to bus 160, and line 172 connects motor 138 to bus 160. In an example, additive source 124 contains ten or more chemical pumps for supplementing the existing chemical pumps on the hydration unit 118 and blender 128. Chemicals from the additive source 124 can be delivered via lines 126 to either the hydration unit 118 and/or the blender 128.

An advantage of the micro-grid 54 is that it can reduce noise. Further, in conjunction with the micro-grid 154, when multiple fracturing pump systems 10 are employed, the pumps 136 can be arranged along a single side of the system 110 to create one high voltage area. Optionally, generators other than turbine generators can be included in the system 110, such as diesel engine generators or natural gas engine generators. In an example when the combustion fuel is natural gas, electric natural gas screw compressors can be included that operate on 480 V delivered from small transformers on the turbine—which can provide 480 power for the turbine motor control center (not shown) as well as the gas compressors. In an alternative example, the power generation can take place at a remote site with power being transmitted to the well pad. In one embodiment load banks can be incorporated into the micro grid. Load shed devices can be incorporated into the micro grid, as well as cooling units for the turbine air intake. Switchgears for power distribution can be included, and that may be trailer mounted, on a skid, or truck. Optionally included are 3500 kVA transformers to transform power from 13.8 kV to 600 V (working voltage), but can be other voltages. An auxiliary unit (not shown) can be included with the system 110 and which provides power for blender unit 128, hydration unit 118, chemical additive/liquid unit, sand conveyer belt, dust vacuum system, wireline, data van, water transfer, heaters, and other needed electrical connections on one or more voltages to the mobile micro power grid. In one embodiment, each auxiliary unit includes, 3500 kVA transformer, variable frequency drive for blender discharge pump's electric motor, 1750 HP, 600 V, 1700 amp 6 pulse VFD. For each VFD, a six pulse converter section employs diode bridge rectification to convert AC to DC. Converter section is unaffected by phase rotation/phase sequence. Overall DC bus design is passive capacitive filter to minimize ripple and maximize power-loss ride-through. DC bus capacitance (total filter capacitance) can be used that is sized to eliminate any requirement for bus inductance (for filtering purposes) when used on a 3-phase system. DC Bus voltage and current can be monitored by a control section to prevent damage to either the drive or the driven equipment. An inverter section makes use of the insulated gate bipolar transistor ("IGBT") power switching transistors to convert DC to three-phase, variable frequency, sinusoidal coded Pulse Wide Modulation ("PWM") waveform. IGBT initialization testing can be performed by the control section on each power up and run command. Each IGBT can have reversed biased diodes (freewheeling) to prevent failure when subjected to motor discharge spikes. Each IGBT can be sized (current) to allow the drive to operate at 100% (current) continuous and 120% (current) for up to 60 seconds. Output currents in each phase can be monitored using Hall Effect current transducers to enable control of flux current, torque current, and providing protection to both the drive and driven equipment. The inverter section can sense and interrupt a phase-to-phase or phase-to-ground fault on the output of the drive. In an example, the control section is designed to prove complete monitoring and protection of drive internal operations while communicating to users at the equipment or at the datavan through one or more user interfaces. Microprocessor logic circuits can be isolated from power circuits. Microprocessor diagnostics can be performed (on application of power) to prove functionality and viability of the microprocessor. Motor diagnostics can be performed (on application of power and each start) to prevent damage to a grounded or shorted motor. The motor diagnostics may be disabled when using a low impedance or high-speed motor. The output voltage can be adjustable from 0 to rated input voltage. The output frequency range can be adjustable for a maximum frequency output of 299 Hz. The output (inverter) section of the VFD can produce a pulse width modulation ("PWM") sinusoidal coded waveform. The motor control center can include soft start for blender hydraulics' electric motor with full voltage non-reversing and hand-off-auto switch. Soft start can be included for hydration units hydraulics' electric motor with full voltage non-reversing and hand-off-auto switch. In one example, as part of the micro grid, VFDs as described above can be used to control the speed of electric motors on frac pumps, blenders, water transfer, and other equipment as needed. In addition, soft starts can be used to start electric motors that are connected to blender, hydration, and/or chemical additive unit hydraulic systems and other equipment that does not need variable frequency drive or variable speed. A motor soft starter is a device used with AC electrical motors to temporarily reduce the load and torque in the power train and electric current surge of the motor during start-up. This reduces the mechanical stress on the motor and shaft, as well as the electrodynamic stresses on the attached power cables and electrical distribution network, extending the lifespan of the system. In one example a soft start and/or VFD can be provided for a separate chemical additive unit or other needed equipment. These components can be packaged onto a single unit or be separated and packaged on different units.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A hydraulic fracturing system for fracturing a subterranean formation comprising:
   a plurality of electric pumps fluidly connected to the formation, and powered by at least one electric motor, and configured to pump fluid at high pressure into a wellbore that intersects the formation, so that the fluid passes from the wellbore into the formation, and fractures the formation;
   a variable frequency drive connected to the electric motor to control the speed of the motor that frequently performs electric motor diagnostics to prevent damage to the at least one electric motor;
   a trailer on which the motor and pumps are mounted;
   a platform assembly mounted to the trailer and from which at least a one of the pumps are accessible by operations personnel; and
   support rails mounted to the platform assembly and that slidingly engage mount assemblies that are coupled to the trailer.

2. The hydraulic fracturing system of claim 1, wherein the platform assembly is selectively moveable between a stowed configuration and spaced laterally inward from an outer periphery of wheels coupled with the trailer, to a deployed configuration and spaced laterally past an outer periphery of the wheels.

3. The hydraulic fracturing system of claim 1, wherein bores in the support rails register with holes in the mount assemblies when the platform assembly is in the stowed configuration, and wherein a pin selectively inserts through the bores and holes to anchor the platform assembly in the stowed configuration.

4. The hydraulic fracturing system of claim 1, further comprising rollers in the mount assemblies that rotate when the support rails slidingly engage the mount assemblies.

5. The hydraulic fracturing system of claim 1, wherein the platform assembly comprises a lateral rail assembly on a side that is distal from the pump.

6. The hydraulic fracturing system of claim 4, further comprising end gates on forward and aft ends of the platform assembly that are pivotingly mounted on opposing axial ends of the lateral rail assembly.

7. The hydraulic fracturing system of claim 6, wherein the end gates are oriented substantially perpendicular to the lateral rail assembly when the platform assembly is moved into a deployed configuration.

8. The hydraulic fracturing system of claim 1, wherein a pair of motors comprise first and second motors, a pair of pumps comprise first and second pumps, wherein the first and second pumps and motors are mounted on the trailer, wherein the first motor is coupled to and drives the first pump, and wherein the second motor is coupled to and drives the second pump.

9. A hydraulic fracturing system for fracturing a subterranean formation comprising:
   a trailer;
   a pump on the trailer that selectively pressurizes fracturing fluid;
   an electrically powered motor that drives the pump;
   a variable frequency drive in electrical communication with the motor;
   a platform assembly coupled with the trailer and that is adjacent the pump so that when operations personnel are on the platform assembly, locations on the pump are accessible by the operations personnel, the platform assembly comprising:
      a platform with a deck and frame, support rails that coupled to the platform, and mounting assemblies attached to a frame of the trailer and which slidingly receive the support rails.

10. The hydraulic fracturing system of claim 9, wherein the platform assembly is stowed so that an outer lateral side of the platform assembly is set laterally inward from an outer edge of wheels that are mounted to the trailer.

11. The hydraulic fracturing system of claim 10, wherein the platform assembly is moveable from being stowed into a deployed configuration where the platform assembly projects laterally past the wheels.

12. The hydraulic fracturing system of claim 9, wherein the platform assembly includes a lateral rail assembly, a forward gate, and an aft gate and which define a safety barrier for operations personnel on the platform assembly.

13. The hydraulic fracturing system of claim 12, wherein the gates each have a lateral side that is affixed by a hinge to the lateral rail assembly and on opposite sides, the hinge comprising a vertically oriented pin and spring, wherein the spring swings free ends of the gates away from the lateral rail assembly when the platform assembly is changed from a stowed configuration to a deployed configuration.

14. The hydraulic fracturing system of claim 13, further comprising elastomeric bungees, each having an end affixed to the lateral rail assembly, and free ends that selectively insert into slotted clips affixed to inner frames on the gates.

15. The hydraulic fracturing system of claim 14, further comprising stop members on the gates that mount to inner frames on the gates and abut the pins when the gates rotate to positions that are substantially perpendicular with the lateral rail assembly.

* * * * *